March 23, 1926.
B. L. ECK
1,577,522
BOILING AND DRAINING KETTLE
Filed July 15, 1925
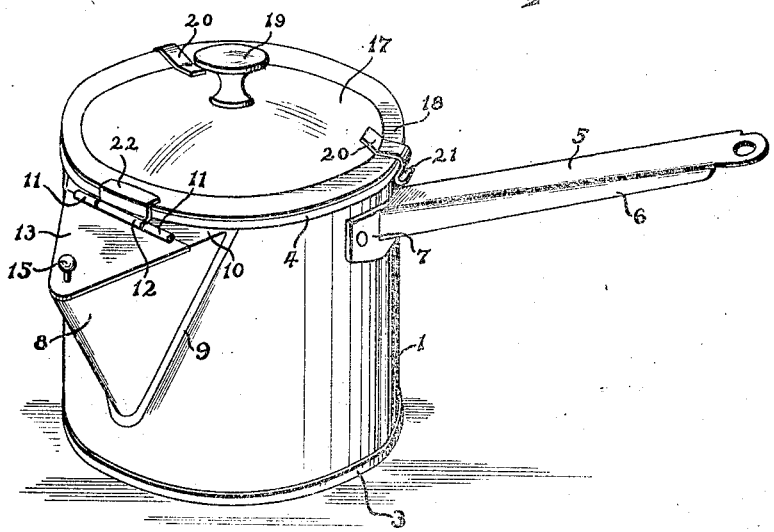
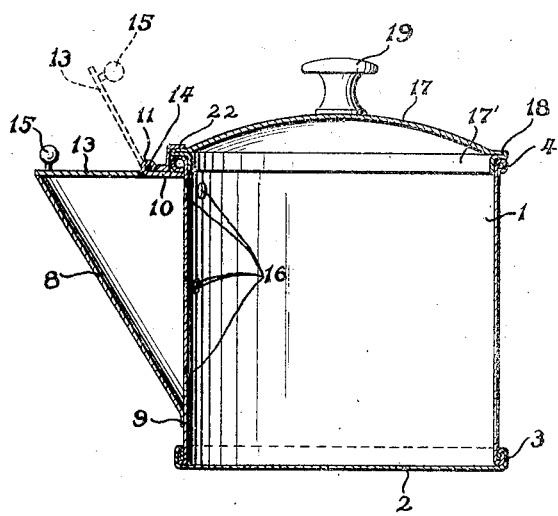
Inventor
B. L. Eck.
By Lacy & Lacy, Attorneys Patented Mar. 23, 1926.

1,577,522

UNITED STATES PATENT OFFICE.

BENJAMIN L. ECK, OF MARINETTE, WISCONSIN.

BOILING AND DRAINING KETTLE.

Application filed July 15, 1925. Serial No. 43,815.

*To all whom it may concern:*

Be it known that I, BENJAMIN L. ECK, a citizen of the United States, residing at Marinette, in the county of Marinette and State of Wisconsin, have invented certain new and useful Improvements in Boiling and Draining Kettles, of which the following is a specification—

This invention relates to a cooking utensil of the type used for boiling vegetables and one object of the invention is to provide a boiler which is so constructed that steam may escape without the cover being lifted and the water poured off after the vegetables have been cooked without danger of the hands or arms being scalded by escaping steam.

Another object of the invention is to provide a cooking utensil of this character which is so constructed that the cover may be very securely held in place so that it will not accidentally slip off when water is being poured off the vegetables after they have been cooked but at the same time to so secure the cover that it may be readily removed when desired.

This invention is illustrated in the accompanying drawing, wherein—

Figure 1 is a perspective view of the improved cooking utensil, and

Fig. 2 is a vertical sectional view through the same.

The body portion or receptacle 1 of this utensil is provided with a bottom 2 which is connected to the annular wall of the body by a rolled joint 3 of the usual construction. At its upper edge the wall is rolled outwardly, as shown at 4, to provide a circumferentially extending bead which, if so desired, may be reinforced by means of a core formed of wire. Aluminum will be preferably used in forming the annular wall and bottom of the body portion, but it will be understood that other metals may be made use of and further that if so desired the body portion instead of being formed of sheet metal may be formed by casting or in any other desired manner. The handle 5 is also formed of sheet metal and has its side edge portions turned downwardly, as shown at 6, to reinforce the handle and its inner end portion bent downwardly to provide a foot 7 which may be either riveted or soldered to the side of the body. It should be noted that the handle, when attached to the body or receptacle 1, extends outwardly therefrom at an upward inclination so that the utensil may be grasped by the handle and very easily lifted from a stove. A spout 8 which is substantially triangular in shape is secured against the forward or front side portion of the annular wall of the body means of an attaching flange 9. This spout is provided with a short upper wall 10 which extends from the annular wall of the receptacle just below the bead 4 and at its forward edge is provided with hinge ears 11 between which fits the hinge ear 12 of the cap 13. It will, therefore, be seen that, when the pivot pin 14 is passed through the hinge ears 11 and 12, the cap 13 will be mounted for swinging movement from the closed position shown in Figs. 1 and 2 to an open position, as indicated by dotted lines in Fig. 2. A knob 15 is provided adjacent the free end of this cap so that the cap may be readily raised when it is desired to pour water out of the receptacle through the spout. Openings 16 are provided in the portion of the annular wall of the receptacle enclosed by the spout so that steam and water may pass from the receptacle through the openings and outwardly through the spout.

When vegetables are being cooked, it is desirable to have the open upper end of the receptacle closed and, therefore, there has been provided a cover 17 which is also formed of sheet metal and has its peripheral portion bent to provide a depending neck 17' which fits snugly within the body and an outstanding annular flange 18 which rests upon the rolled bead 4 when the cover is in place. A knob 19 which is of a conventional construction is secured upon the cover so that the cover may be easily put in place or removed. While the cover fits snugly in engagement with the body portion of the receptacle, it is desired to have this cover very securely held in place so that it cannot accidentally drop out of place when the receptacle is tilted in order to pour water through the spout 8. Therefore, there have been provided latches 20 which are formed of strips of resilient metal. These latches extend radially of the cover with their bill portions 21 extending downwardly for latching engagement about and beneath the bead 4. Since the latches are formed from strips of resilient metal, the cover may be very easily forced downwardly into tight closing engagement with the body and may be readily removed when grasped by the knob 19 and a pulling action exerted. The latches, however, will prevent any danger of the cover accidentally slipping out of place when the utensil is grasped by the handle and tilted so that water may flow out of the body through the spout. The forward portion of the cover fits beneath the clip 22 carried by the upper wall 10 of the spout.

When this boiler is in use, the water and the vegetables to be cooked are placed in the receptacle or body portion and the cover 17 put in place. The utensil is then placed upon the stove and as steam is generated it passes through the spout and the pressure of the steam will cause the lid 13 to be swung upwardly a sufficient distance to permit escape of the steam. After the vegetables have been cooked the required length of time, the receptacle will be grasped by the handle and lifted from the stove. It is then merely necessary to tilt the receptacle forwardly and the water in the receptacle will flow out of the same through the spout. If the lid 13 is not swung open by the water, it may be grasped by the knob 15 and manually swung to an open position. If vegetables are being cooked which should be practically dry when removed from the boiler, it will be again placed upon the stove so that the excess moisture will be driven off. The boiler will then be again removed from the stove and the cover 17 grasped by its handle 19 and removed by a pulling action. It will, therefore, be seen that when this utensil is used it is not necessary to partially lift the cover and hold it in place with one hand when pouring the hot water off cooked vegetables which it is desired to have remain in the body portion of the receptacle. Therefore, there is no danger of the hand being scalded by hot steam or by water poured from the receptacle.

Having thus described the invention, I claim:

A cooking utensil comprising a receptacle open at its upper end and having an annular wall, said wall being perforated to provide outlet openings, a handle extending from said receptacle, a spout secured upon the outer face of said annular wall and enclosing the perforated portion thereof, said spout being open at its upper end and having a fragmentary upper wall extending across its rear end portion and engaging the wall of said receptacle above the perforated portion thereof, said upper wall being provided at its forward edge with hinge ears, a cap for the open upper end of said spout resting upon the upper end thereof and at its rear end pivotally connected with said hinge ears for vertical swinging movement into and out of a closed position, a cover for the open upper end of said receptacle, a clip carried by the upper wall of said spout and extending in overlapping engagement with said cover, and latches carried by said cover for engaging the wall of said receptacle and cooperating with said clip to hold the cover in closing relation to the open upper end of the receptacle.

In testimony whereof I affix my signature.

BENJAMIN L. ECK. [L. S.]